United States Patent [19]

Ahlen

[11] 4,314,487
[45] Feb. 9, 1982

[54] BRAKING METHOD FOR VEHICLE TRANSMISSION

[75] Inventor: Karl G. Ahlen, Bromma, Sweden

[73] Assignee: S.R.M. Hydromekanik Aktiebolag, Stockholm-Vallingby, Sweden

[21] Appl. No.: 3,526

[22] Filed: Jan. 15, 1979

[30] Foreign Application Priority Data

| Aug. 18, 1978 | [GB] | United Kingdom | 3309/78 |
| Aug. 24, 1978 | [GB] | United Kingdom | 34391/78 |
| Nov. 6, 1978 | [GB] | United Kingdom | 43313/78 |
| Nov. 6, 1978 | [GB] | United Kingdom | 43315/78 |
| Nov. 21, 1978 | [GB] | United Kingdom | 45431/78 |
| Nov. 21, 1978 | [GB] | United Kingdom | 45432/78 |

[51] Int. Cl.³ ............... F16H 47/00; B60K 41/12
[52] U.S. Cl. ........................... 74/865; 74/877; 74/740; 74/645
[58] Field of Search ............... 192/4 A, 3.22, 3.23, 192/3.27, 3.32; 74/857, 865, 866, 877, 740, 645, 688, 732

[56] References Cited

U.S. PATENT DOCUMENTS

| 2,749,775 | 6/1956 | Simpson | 192/3.28 |
| 3,035,455 | 5/1962 | Peras | 74/865 X |
| 3,368,426 | 2/1968 | Karig et al. | 74/865 |
| 3,874,254 | 4/1975 | Ahlen | 74/645 X |
| 3,888,141 | 6/1975 | Ahlen | 74/730 |
| 4,010,660 | 3/1977 | Ahlen | 74/688 |
| 4,039,061 | 8/1977 | Pruvot et al. | 192/4 A |
| 4,061,215 | 12/1977 | Ishikawa | 192/4 A |
| 4,077,502 | 3/1978 | Nitsche et al. | 192/3.23 |
| 4,100,823 | 7/1978 | Krist | 74/645 |

Primary Examiner—George H. Krizmanich
Attorney, Agent, or Firm—Larson and Taylor

[57] ABSTRACT

A method is provided for obtaining braking capacity from the engine-transmission unit of a hydromechanical vehicle transmission having a torque converter in combination with a plurality of mechanical gear steps. The braking force is provided by running the turbine member faster than the engine, either with the guide member of the torque converter kept stationary or released so as to be free to rotate and with the torque converter's direct drive clutch released, and with the pump member of the torque converter connected to the rotating casing of the torque converter which is connected to the engine. The braking capacity is regulated by regulating the engine speed and changing the gear ratios. Regulation of the engine speed can be accomplished by throttling the exhaust or, under other circumstances, by causing the engine to rotate faster.

18 Claims, 5 Drawing Figures

BRAKING METHOD FOR VEHICLE TRANSMISSION

FIELD OF THE INVENTION

This invention relates to an engine hydromechanical transmission providing a torque converter in combination with a plurality of mechanical gear steps and, more particularly, to a method for providing braking in such a transmission which can be regulated, according to demand, within predetermined limits.

BACKGROUND OF THE INVENTION

Hydromechanical transmissions have been utilized to obtain braking torque as desired. However, systems used up to now, such as, for example, that disclosed in commonly assigned U.S. Pat. No. 3,261,232, do not provide any capability for regulating braking except by connecting different mechanical gears. Conventional hydromechanical transmissions have heretofore utilized a separate "retarder". Although such arrangements provide regulation or modulation of the braking torque, the retarder, which comprises a variably filled hydrodynamic coupling, provides considerable resistance against rotation when not in use and only filled with air. While there are techniques for reducing this loss of the air filled retarder, the arrangement for accomplishing this requires considerable space and is heavy and expensive.

As stated above, the prior art system referred to above would not regulate braking itself. At best, one could obtain different degrees of braking capacity by different settings of the torque converter and by utilizing different mechanical gear connections. However, the method of the present invention provides for regulating the braking force between wide limits and with less shock when changing between mechanical gear ratios, and does not depend on any additional mechanical structures except that concerning the automatic control for providing a predetermined braking setting.

SUMMARY OF THE INVENTION

As is evident from the foregoing, a basic purpose of the present invention is to extend the braking capacity of an engine-transmission unit without adding any additional structure in order to obtain the braking force. At the same time, the invention makes it possible to vary the braking torque within wide limits. It is noted that these limits are greater than those provided with separate hydraulic retarder units such as mentioned above and that the invention also avoids the losses associated with such retarder units when not connected. In addition, the invention provides softer shifts between the different braking fields defined by the gear ratio of the gear which is connected. A further purpose of the invention is to provide automatic control of the braking torque in such a way that the driver can manually set the desired braking capacity independently of speed and according to a predetermined relationship between vehicle speed and braking capacity.

In general, the invention is concerned with a method used with an engine transmission unit for a vehicle wherein the transmission comprises a torque converter having a direct drive clutch, a guide vane member which can be released or fixed against rotation (or even be connected to be driven backwards) and a mechanical gear transmission of the power shift type in series with the torque converter. According to the invention, the braking torque is obtained by running the turbine member of the torque converter at a higher speed than the primary side of the torque converter (the pump member) which is rotationally connected to the engine, i.e., by overspeeding the turbine member. This overspeeding of the turbine member is carried out with the direct drive clutch released and with the guide vane member in different settings and with the complementary mechanical gear connected to obtain the desired increase in speed of the turbine member. In accordance with this method, braking torque is regulated by setting the engine speed and thus the speed of the primary side of the torque converter. Setting of the engine speed either requires utilizing the engine to provide compression braking or utilizing an extra gear pump driven by the primary side of the torque converter to modulate the torque absorption thereof.

The setting of the different brakes and couplings, and the regulation of the engine speed to provide a desired braking capacity is preferably controlled by an automatic control system controlling the transmissions. This system is disclosed in commonly assigned, copending application Ser. No. 3,527 entitled "Vehicle Transmission Control System", filed on Jan. 15, 1979.

As stated above, the guide vane member of the torque converter is kept stationary to obtain a higher braking torque. On the other hand, in another mode, the guide vane member is released to rotate freely in either direction. Preferably, the engine is made to absorb driving torque applied to the pump member of the torque converter by the turbine member so as to obtain a desired ratio between the engine speed and turbine member speed. Moreover, the engine can be set at a higher speed than that obtained when driven by the pump member of the torque converter so as to reduce the braking torque.

In one embodiment, the primary side of the torque converter drives a pump unit for exerting braking torque on this primary side of the converter and the torque is regulated by varying throttling of the pump unit. In a related embodiment, the pump is of the variable capacity type and the torque is regulated by adjusting capacity of the pump. In addition, the torque can also be regulated by varying the throttling of and varying the capacity of the pump unit.

Advantageously, the working fluid of the torque converter is utilized in the pump unit driven from the primary side of the torque converter and the fluid passing through the pump unit is channeled to circulate through a heat exchanger of the torque converter. In addition, a part of the pressure fluid of the pump unit can be utilized to drive a cooling fan of the engine by a hydrostatic motor.

Regarding the electronic control system referred to above, the braking capacity level in relation to speed of the vehicle is preferably related to a manual setting and the operation of the electronic control system for the transmission. The control system is also used to control both connection of the gear ratio in the complementary mechanical gear and the braking or driving of the engine to obtain the desired level of braking at different vehicle speeds. Moreover, where the torque converter has a releasable pump member or turbine member, the electronic control system is used to control release of the pump member turbine member from driving connection with the engine during the change of the mechanical gear ratios to obtain a hydraulic synchronizing effect to assist in determination of the new engine speed.

In one mode of operation, the engine speed is adjusted in relation to the mechanical gear shift by controlling the fuel injection to the engine. Also, reverse gear can be connected at low speed and the engine speed regulated to obtain braking to a complete stop.

Other features and advantages of the invention will be set forth in, or apparent from, the detailed description of the preferred embodiments found hereinbelow.

BRIEF DESCRIPTION OF THE DRAWINGS

FIGS. 3, 4 and 5 are diagrans of selected operating characteristics of a transmission incorporating the electronic control system of the invention, wherein

DETAILED DESCRIPTION OF THE PREFERRED EMBODIMENTS

Referring now to the drawings, like elements are represented by like numerals throughout the several views.

Figure 1:
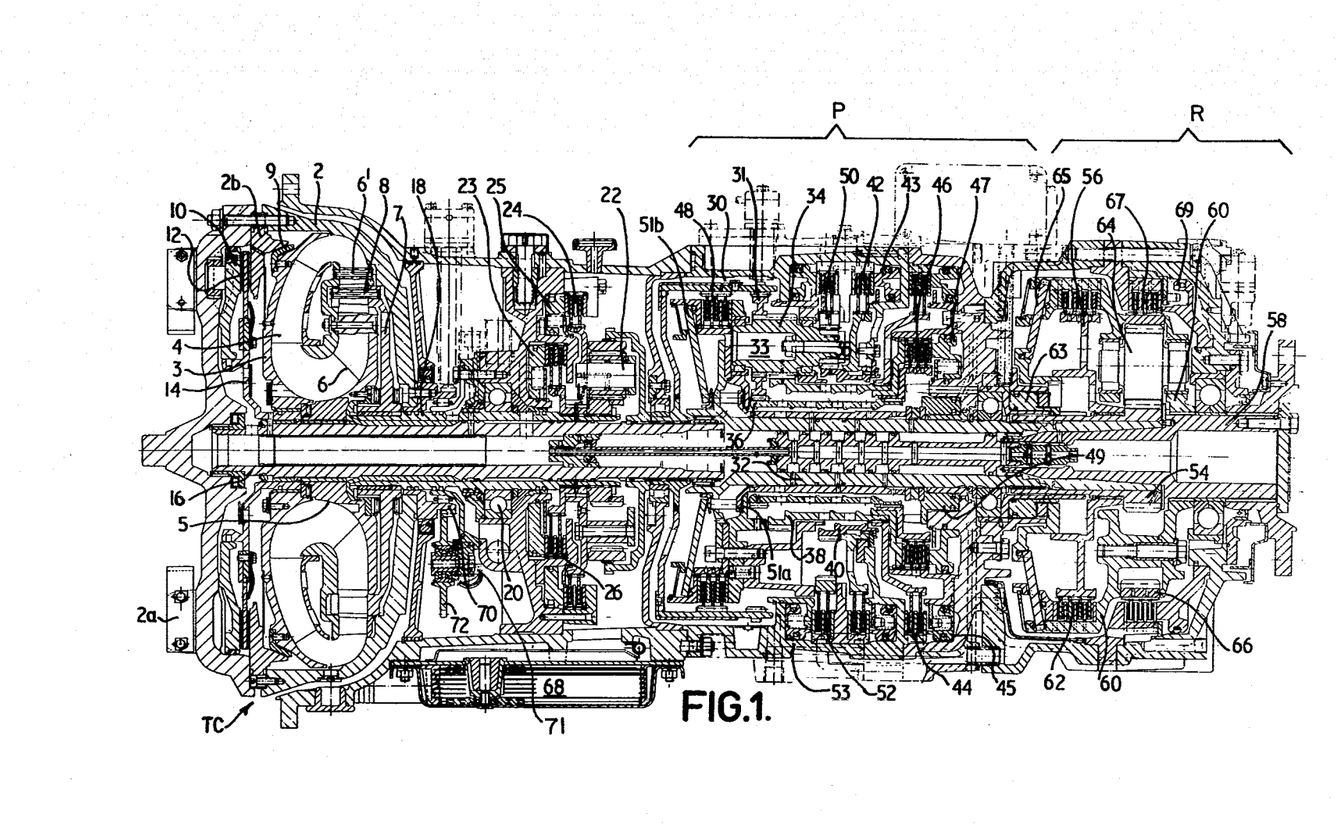
FIG. 1 is a longitudinal cross section of a transmission in which, in a preferred embodiment, the braking method of the invention is incorporated.

FIG. 1 illustrates a hydromechanical transmission with which the vehicle transmission braking system of the invention can be used. At the left end of FIG. 1 there is shown a torque converter TC including a rotating casing 2 adapted to be driven by a vehicle engine or the like via abutment means 2a. Internally, the illustrated torque converter comprises a pump member 3 having a ring of pump blades 4 mounted thereon. The torque converter further comprises a turbine member 5 having a ring of turbine blades 6 mounted thereon and a guide vane 7 having a ring of guide blades 8 thereon, wherein said guide blades may be used as a turbine. Connected to the turbine member 5 is a hub 14 to the outer periphery of which is attached a friction disc 12. The rotating casing 2 includes an inward extension 2b located between the disc 12 and the pump member 3 and a servo piston 10 on the outer side of disc 12. The torque converter shown herein is of the releasable pump member type which is shown and described in detail in prior U.S. Pat. No. 3,893,551, issued July 8, 1975. In accordance therewith, the pump member 3 is movable to the left to engage the pump member 3 with the rotating casing at conical friction coupling 9 for hydraulic drive. In another mode of operation, pump member 3 is moved to the right, releasing coupling 9, and the servo piston 10 is actuated to urge disc 12 into frictional engagement with extension 2b for direct drive between the rotating casing 2 and the turbine member 5. The turbine member 5 and the hub 14 are drivingly engaged with the turbine shaft 16. The guide member 7 is mounted on a guide member shaft 18 which rotates relative to turbine shaft 16 and which is mounted on the stationary portion of the casing at bearings 20. Shaft 18 is connected via a hub and friction discs to a brake 26 operable by servo piston 23 for holding the guide member 7 stationary for "single rotation". Shaft 18 is further connected to a planetary gear 22, the carrier of which is connected to friction discs forming a part of brake 24 which is operated by servo piston 25, whereby the guide member rotates oppositely from the turbine member for "double rotation". Arrangements for braking the guide member for single or double rotation are well known, one example being shown in the prior U.S. Pat. No. 4,010,660, issued Mar. 8, 1977. In hydraulic drive, torque multiplication is provided via the guide member blades, and the output of increased torque via the turbine member to the turbine shaft 16. Double rotation with brake 24 actuated allows a much higher multiplication of torque, but over a smaller range of speed ratios, than does single rotation (engagement of brake 23) wherein speed ratio is defined as the ratio of turbine shaft speed to rotating casing speed. Torque multiplication decreases with increasing speed until it becomes advantageous to disconnect hydraulic drive, i.e. disconnect the conical coupling 9, and the actuate servo piston 10 to drive the turbine shaft 16 directly from the rotating casing 2 via elements 12 and 14.

The torque converter includes a heat exchanger 68 through which fluid is pumped by means of pump unit 71 operated by means of a gear 70 via an intermediate gear 72. A system including, in a torque converter, a heat exchanger of this type, together with a pump unit and the appropriate fluid lines, is shown in greater detail in prior U.S. Pat. Nos. 4,056,019 and 4,058,980, issued respectively on Nov. 1, 1977 and Nov. 22, 1977.

To obtain overspeed of the turbine, there is provided downstream from the torque converter, a mechanical gear transmission comprising a first portion P having four forward gear ratios and a reverse gear, and a second portion, R referred to as a "range gear" having either a 1:1 drive or a further gear reduction. A transmission having such a first portion P followed by a second "range" portion R is shown in greater detail in co-pending U.S. application Ser. No. 843,520 filed Oct. 19, 1977, in the name of Karl G. Ahlen, also the inventor herein.

The turbine shaft 16 is connected to a ring gear 30. The secondary or output shaft of this first portion is designated as 32. Ring gear 30 drives a planetary gear 33 having a plurality of sections including a large diameter section 31 splined onto an intermediate diameter section 34 with a smaller diameter section 35 to the right. Intermediate between sections 34 and 35 is a bearing means for mounting this planetary gear 33. Sections 31, 34 and 35 are respectively drivingly engaged with splines of sun gears 36, 38 and 40. Section 35 isdfurther engaged with a ring gear 50 operating as a reverse gear. Sun gears 36, 38 and 40 are either released for free rotation or connected to the stationary portion of the casing via friction brakes 46, 44 and 42, respectively, which friction brakes are actuated by servo pistons 47, 45 and 43, respectively. Reverse gear 50 is selectively engaged with the casing via friction brake 50 which is actuated via servo piston 53.

Alternatively, ring gear 30 can be connected directly to the carrier of planetary gear 33 and hence directly to secondary shaft 32 by engagement of friction clutch 48, the latter caused by actuation of servo piston 49, this in turn urging member 51a to the left to turn lever 51b such that its upper portion moves to the right to engage clutch 48.

Shaft 32 extends toward the right in FIG. 1 into the second portion or "range gear" whereat it is drivingly engaged with an elongated splined member 54 which is drivingly engaged with both a hub 56 and planetary gears 64. The holder 60 of planetary gear 64 is drivingly engaged with a secondary gear 58 which is the output shaft of the entire transmission. Planetary gear 64 is engaged with a ring gear 66 which can be braked relative to the stationary portion of the housing by means of a friction brake 67 which is actuated by servo piston 69. This would permit a speed reduction between shafts 32 and 58. Alternatively, shafts 32 and 58 may be operatively engaged to each other via hub 56 and friction clutch 62, the latter frictionally engaging hub 56 with the planetary gear holder 60. Friction clutch 62 is actuated via a servo piston 63 which acts via a lever system 65.

Figure 2:
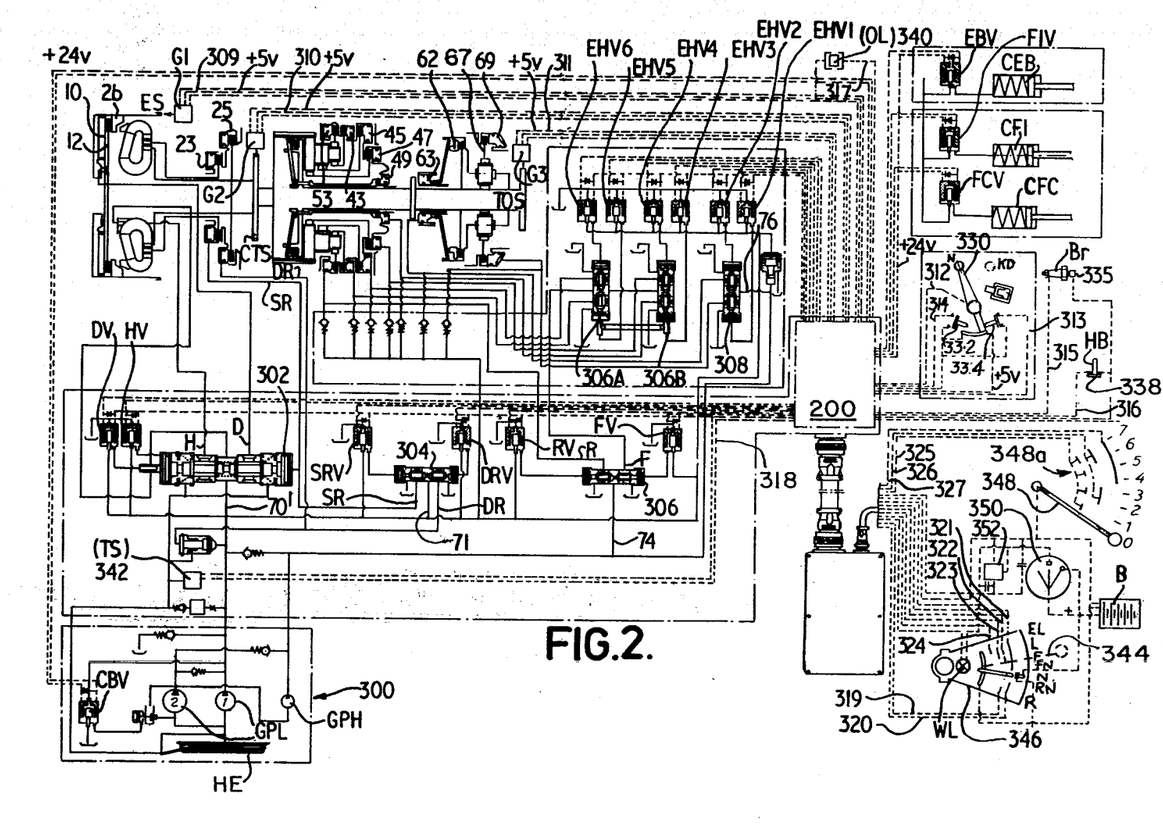
FIG. 2 is a schematic diagram of the essential components of the transmission of FIG. 1 together with the mechanical and electronic controls thereof.

Referring now to FIG. 2, there is shown an electrohydraulic-electronic control system described in the aforementioned copending application Ser. No. 3,527, entitled "Vehicle Transmission Control System". In FIG. 2, mechanical connections are indicated in solid lines and electrical connections in dashed lines.

For convenience, the hydraulic systems contained within FIG. 2 will be described first. A pump system 300 includes a high pressure gear pump GPH and a pair of low pressure gear pumps GPL, the pressure of which is controlled by a solenoid valve CBV. There is also included a heat exchanger HE as described in the previously mentioned U.S. Pat. No. 4,058,980. These pumps provide the pressurized oil to operate the valves of the system and the pressurized oil which flows through the valves to the various servo pistons and to the torque converter chamber. The system comprises a first valve 302 which controls the flow of fluid to the torque converter, a second valve 304 which controls the flow of fluid to single and double rotation servo piston 23 and 25, a third valve 306, which together with secondary valves 306A and 306B, controls the flow of fluid to the first portion of the mechanical transmission and lastly a valve 308 which controls the flow of fluid to the servo pistons 63 and 69 of the range gear. Oil under pressure is delivered from pump system 300 to the valve 302 for delivery to the torque converter for selecting direct or hydraulic drive, and to the valve 304 for devlivery to single and double rotation servo pistons 23 and 25. Oil under pressure is also delivered from pump system 300 to the valve 306 and its secondary valves 306A and 306B for delivery to the servo pistons of the first portion P of the mechanical transmission and to valve 308 for delivery to the servo pistons of the second portion R of the mechanical transmission. Finally, low pressure fluid from pump system 300 is also delivered to all the electro-hydraulic solenoid valves for controlling operation of said valves 302, 304, 306, 306A, 306B and 308.

Referring again to FIG. 2, and specifically to valve 302, it will be seen that the pressurized oil enters the valve at line 70'. With the spool of valve 302 in its neutral position, the torque converter is in its neutral position with neither the coupling 9 nor the disc 12 engaged with extension 2b of the rotating casing 2. Movement of valve 302 in one direction will then connect the pressurized fluid from line 70' to line H for hydraulic drive and movement of this valve in the other direction will connect such pressurized fluid with line D for actuation of servo piston 10 and hence direct drive. It is obvious, therefore, that one cannot place both lines H and D under pressure at the same time.

Turning to valve 304, pressurized fluid through line 71 will flow through either a first line SR or a second line DR, depending on the direction of movement of valve 304, to actuate either single rotation piston 23 or double rotation piston 25.

At valve 306, pressurized oil entering at line 74 is delivered either through line R to servo piston 53 or through line S to the two further valves 306A and 306B. Valve 306A has three positions including two end positions whereat the entering pressurized fluid is delivered to either servo piston 45 or servo piston 43. The third position is a neutral position whereat the fluid passes through valve 306A to valve 306B. The latter, in turn, has two positions, a first and position whereat this pressurized fluid passes through a line to servo piston 47 and a second position whereat this fluid passes through another line to servo piston 49.

Finally, valve 308 receives pressurized fluid from line 76. As this valve 308 is moved to its end positions this pressurized fluid is delivered to either servo piston 63 which operates friction clutch 62 or servo piston 69 which operates brake 67.

Thus, in summary, the hydraulic control valve system, including valves 302, 304, 306, 306A, 306B and 308, controls the flow of oil to the servo-pistons which directly engage the various brakes and clutches in the transmission of FIG. 1 as described above, with pressurized oil being obtained from the feeder pump system 300 which is driven by the primary side of the transmission. The hydraulic valve system is, in turn, controlled by means of solenoid valves which are described below and which, through electrical signals, control the flow of oil actuating the various servo-pistons in the hydraulic valve system.

The system of FIG. 2 further includes an engine brake cylinder CEB, a fuel injection cylinder CFI and a fuel cut-off cylinder CFC which are controlled by solenoids EBV, FIV, FCV. These operators and their functions are conventional.

As mentioned hereinabove and shown in FIG. 2, the setting of the transmission is determined by plurality of solenoid-type valves. These valves are indicated in FIG. 2 at DV, HV, SRV, DRV, FV, RV, EHV1 to EHV6 and CBV. These valves control, via the hydraulic valve system including valves 302, 304, 306, 306A, 306B and 308, the flow of oil for connection of direct drive, hydraulic drive, single rotation drive, double rotation drive, forward, reverse, mechanical gears one to eight, and the pressure and capacity of pump system 300 respectively. In particular, solenoid valves DV and HV control valve 302, solenoid valves SRV and DRV control valve 304, solenoid valves F and R control valve 306, solenoid valves EHV1 to EHV6 control valves 306A, 306B and 308, while, as mentioned previously, solenoid valve CBV controls pump GPL system 300. In addition, the further solenoid valves FIV, FCV, and EBV control the engine-influencing devices for fuel injection, fuel cut-off, and engine braking, respectively, as mentioned hereinabove and as discussed in more detail below in connection with the present invention.

Turning again to FIG. 2, the input signals referred to above comprise shaft speed signals which appear on lines 309, 310 and 311, throttle position signals which appear on lines 312, 313 and 314, brake pedal and hand-brake signals which appear on lines 315 and 316 respectively, oil level and temperature safety signals which appear on lines 317 and 318, respectively; selector lever position signals which appear on lines 319, 320, 321, 322, 323 and 324; and brake lever position signals which appear on lines 325, 326 and 327.

The shaft speed signals are square wave, TTL pulses consisting of two levels, viz,. 0 V and +5 V. The pulses are obtained from the sensor/amplifier units G1, G2 and G3 disposed adjacent to gear teeth rotating with the engine shaft ES, converter turbine shaft CTS, and transmission output shaft TOS, respectively, as illustrated.

Considering the other input signals in more detail, the throttle position signals appearing on lines 312 to 314 are related to the position of the throttle lever indicated at 330 and these signals include a variable voltage between 0 and 5 V which is, proportional to the throttle position and which is provided by a potentiometer (not shown), the tap of which is attached to the throttle lever 330. Two further signals, indicating the terminal positions "throttle released" (or N) and "kickdown" (or KD), respectively, are obtained by use of contactors 332 and 334 which open or close connections to ground. When the contactors 332, 334 are in the open positions, the microcomputer holds the signal line at +5 V.

The brake pedal (Br) and handbrake HB signals on lines 315 and 316 are obtained in a same manner, i.e., through the use of contactors, indicated generally at 335 and 338, respectively, which provide openings or closing of a connection to ground.

The oil level (OL) and temperature safety (TS) switch signals appearing on lines 317 and 318 are provided by switches, indicated generally at 340 and 342, and are held at +24 V (the battery voltage) during normal operation. Excessively low oil level or high oil temperature cause the respective switch 340 or 342 to close a connection to ground, thus lighting a warning lamp WL on the instrument panel and simultaneously activating a delay circuit in the microcomputer. This delay circuit allows time for the driver to take some independent action before the microcomputer releases the transmission so as to prevent damage.

The selector lever and the brake lever are intended to be directly controlled by the driver through the microcomputer 200. The signals are produced, as shown, by a number of switch contactors, which control the completion of connections to ground, thereby providing for a combination of signals. The microcomputer 200 holds the signal lines at +5 V for an open connection. The selector lever is indicated in FIG. 2 in dashed lines at 344 and the contact plate at 346, while the six output lines 319 to 323 are respectively dedicated to the following driving settings: reverse (R), reverse neutral (RN), neutral (N), forward neutral (FN), forward (F), low (L) and extra low (EL). In the neutral (N) position, the transmission brakes are released and the turbine pump is released. In the forward neutral (FN) position, the DR brake (or possibly the SR brake) is applied. The turbine pump is released, so that free wheeling is provided and instantaneous vehicle stopping can be provided. In the forward (F) position, the turbine pump member is engaged and this is the normal driving position. The other positions are self-explanatory. It will, of course, be understood that more and different settings can be provided as desired.

The brake lever, which is indicated at 348, uses lines 325 to 327 to indicate eight different braking levels by virtue of the pattern of switch contactors 348a illustrated. These brake lever input lines like those from the selector lever are connected to the microcomputer 200.

Again, it will be understood that the foregoing listing is not exhaustive, and the microcomputer 200 has a capacity to process many more of each of the different types of signals discussed The system is powered by the vehicle battery B which provides +24 V and the system ground. The battery B is connected to a voltage regulator 352 which provides a stabilized +5 V supply, the voltage regulator being located in the selector lever box or housing with an ignition switch 350 and serving to supply the microcomputer, the shaft speed signal amplifiers, and the throttle position potentiometer mentioned above. All connections to ground in the system are made through a common ground line, connected to the minus pole of battery B via the microcomputer 200.

Figure 4:
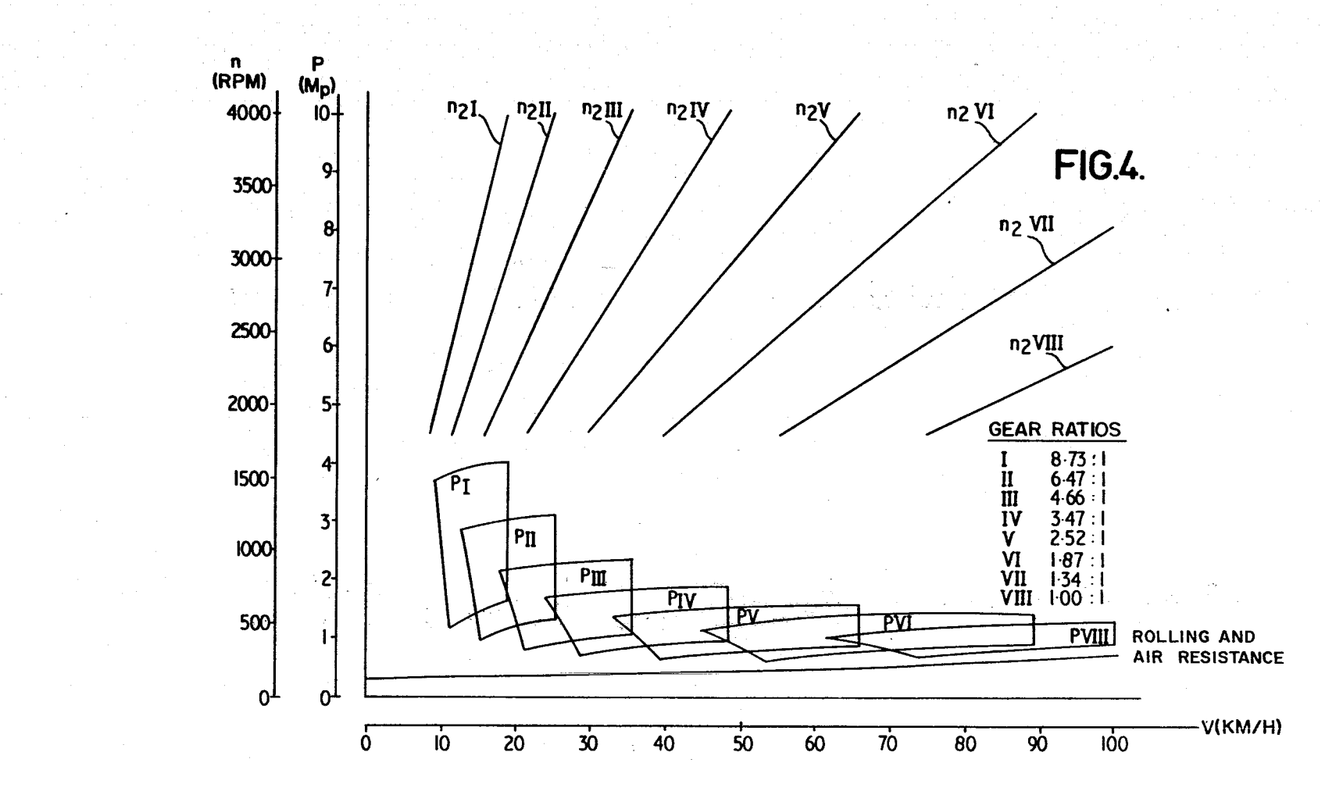
FIGS. 4 and 5 show operating conditions of the transmission utilizing the braking method of the invention, FIG. 4 showing the braking force that can be obtained at different speeds and FIG. 5 showing the relationship between braking force and engine speed and the necessary braking force on the engine to provide a desired braking force.
Figure 5:
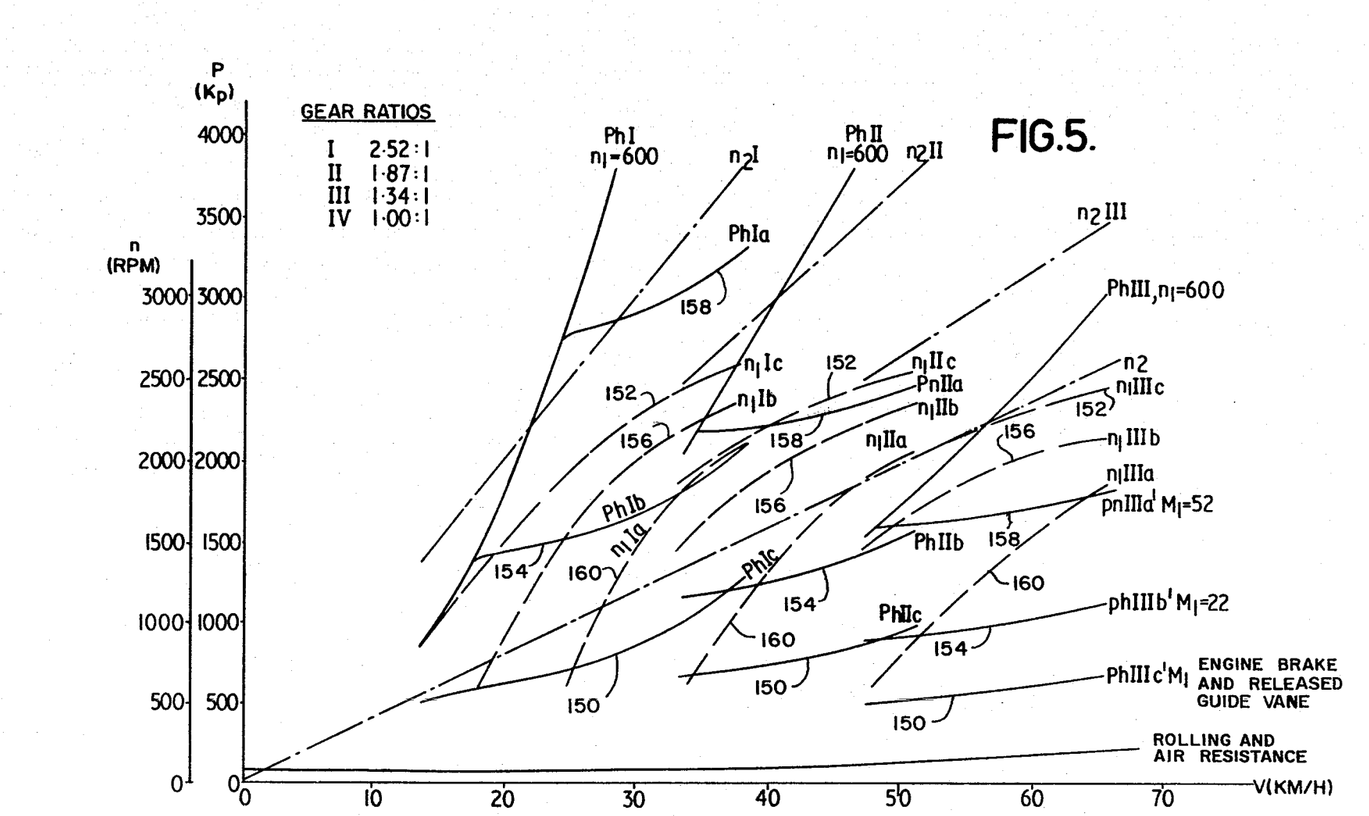

Before discussing the present invention in more detail, the operating characteristics of the overall system will be briefly considered. The full throttle performance characteristics of an engine-transmission unit as described above are shown in FIG. 3, including the characteristics for double rotation drive, single rotation drive, and direct drive together with the eight-speed gear. For sake of simplicity, the hydraulic drive characteristics are shown for the first four mechanical gear ratios only; however, all combinations are, of course, possible and the determination and control of these combinations (for all throttle positions) necessitates the use of an electronic control system such as described in the above-mentioned copending application. In addition, the determination and control of transmission settings (including the control of the engine) during braking by overspeeding the turbine or variations thereof, as provided in accordance with the invention, generally require such a control system. In brief, braking by means of overspeeding the turbine is obtained for the transmission of FIG. 1 by releasing the direct clutch friction disc 12, and connecting coupling 9 of the releasable pump member 3 and connecting the single rotation brake 25 when the speed ratio as defined above is greater than unity. This condition is achieved by providing for a gear ratio in the mechanical gear which is lower than what would normally be provided. With this technique, the direction of the flow of power in the transmission is thus reversed, thereby producing a braking or retarding effect. The characterstics of the retarding function are shown in FIGS. 4 and 5, where regulation or modulation of the amount of braking is achieved in part by influencing or controlling the engine, by means of pressurized air devices, vacuum devices, electro-magnet devices, or other electrical devices, which devices are energized by means of electrical signals. FIG. 5 shows other variations of hydraulic braking, where either the pump member 3 or the single rotation brake 26 is released, that is, free to rotate. These variations also produce a retarding effect which is modulated by influencing or controlling the engine as described in more detail hereinafter.

Figure 3:
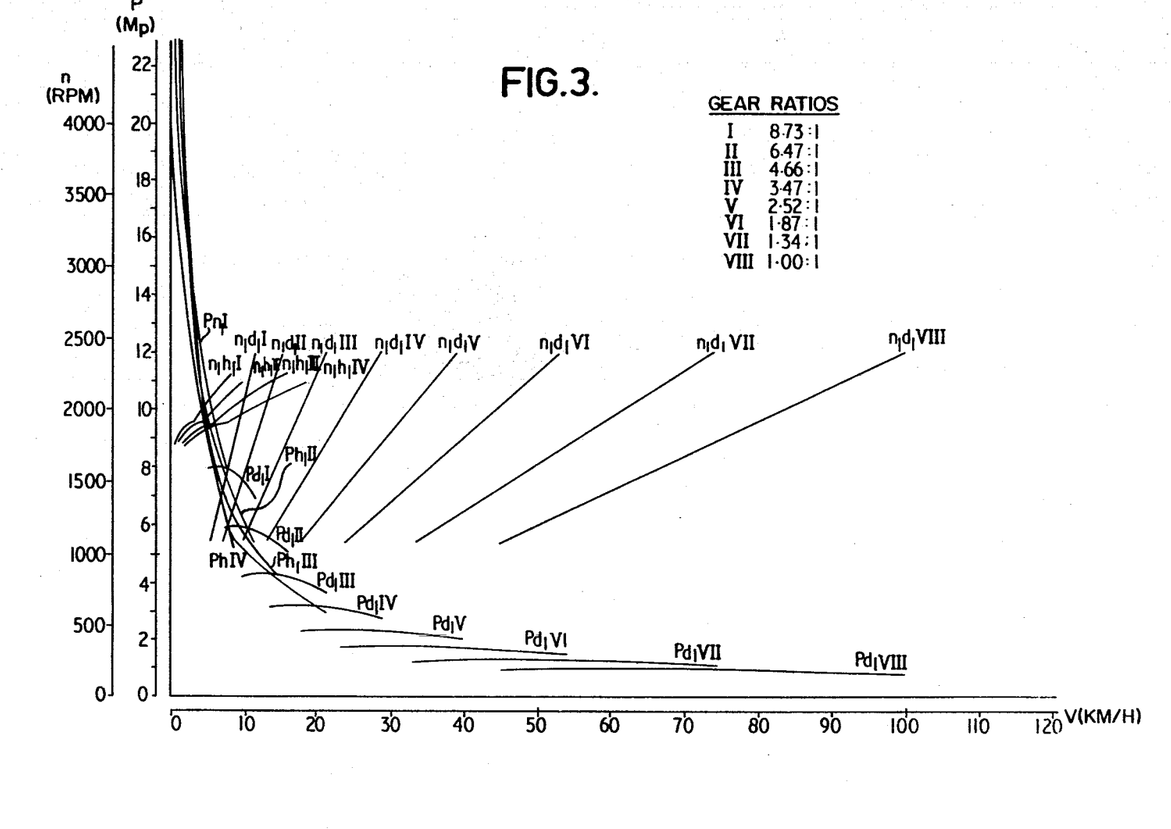
FIG. 3 is a maximum power tractive effort diagram showing operating conditions of the transmission when the engine is applying tractive effort.

It will be understood that mechanical transmission P and R provide eight forward gear steps as shown schematically and numerically in FIG. 3. The first four gear steps are of course the four forward gear ratios in mechanical transmission P with the brake 67 of the mechanical range gear R connected to the stationary casing, thereby providing a reduction gear ratio through the mechanical transmission R. The next four gear steps V through VIII again comprise the same four gear steps of mechanical transmission P, but this time with the input to mechanical range gear transmission R connected directly to the output shaft 58 via engagement of brake 62.

Depending on how hard the throttle is pressed, one will have different tractive efforts. If the throttle is pressed down to maximum, then one achieves the tractive effort illustrated in FIG. 3 at curve $Pn_1I$. However, normally, the vehicle accelerates faster than the engine in the low gears, and therefore this high tractive effort is not actually obtained except when climbing extremely high grades. When, however, the vehicle has accelerated to a certain point in relation to the engine speed, then the guide member 7 is disconnected from the turbine and connected to the stationary casing, i.e. brake 24 is released and brake 26 is engaged, which of course comprises normal single rotation drive. This condition remains until the point is reached whereat direct drive is required at which point coupling 9 is disengaged, freeing the pump member 3 from the rotating casing and piston 10 is then activated to engage the disc 12 against the extension 2b of the rotating casing 2. The point at which the transition from one condition to the other occurs is related to the throttle-pedal position which will be at different speed ratios between the pump member and the turbine member after the vehicle has accelerated sufficiently. In first gear the vehicle can now accelerate up to about 12 km/hour and the tractive effort is represented by the curve $Pd_1I$ in the case of maximum throttle. Normally the first two or three gear steps of the mechanical transmission P and R are used only for starting under severe conditions or for driving fully loaded up very high grades. Normally, therefore, the automatic control means may have already connected up to the fifth gear or possibly up to the eighth gear before there arises the need for applying some type of braking or retardation.

In conventional hydraulic braking, at the torque converter, the direct drive is connected and the guide member 7 is held fixed to the stationary casing or at lower vehicle speeds the guide member 7 can be connected to the turbine at brake 24 (again, with direct drive connected) thereby making the guide member rotate backwards.

While this conventional type of braking is satisfactory, it does not provide the ability to regulate or modulate the braking except by connecting different gears. Therefore, in lieu of this conventional braking, in accordance with the present invention it is possible to provide a hydraulic braking by overspeeding the turbine, having disconnected the direct drive connection. According to this arrangement, the automatic control means must connect a gear for a certain overspeeding of the turbine as shown diagrammatically in FIGS. 4 and 5. In FIG. 4 the lines marked $n_2$ with the indices I–VIII indicate turbine speeds, and the areas marked P with indices I–VII indicate the retardation or braking force obtainable, the lower limits of the obtained retardation force being with a released guide member and with the engine running due to torque transmitted from the turbine member to the pump member. These lower limits of FIG. 4 are represented in FIG. 5 by the lines 150 (Ph I–IIIc′) for three different gear ratios, and the upper lines in FIG. 4 are represented in FIG. 5 by the lines marked 158 (Ph I–IIIa′). There is a difference, however, in FIG. 5 wherein the lines relate to constant braking torque on the engine by compression braking or the like and the speeds of the engine in FIG. 5 are in accordance with the dot-dash lines marked 152, 156 and 160 ($n_1$I–IIIa–c). FIG. 5 is the more theoretical diagram while FIG. 4 shows the limits of retardation force obtainable by controlling the connection of gear ratios in relation to speed and engine speed also taking into consideration the temperature of the transmission, etc.

As will be seen from FIG. 4, seven braking fields (i.e., defined areas in drawings) are obtained with eight gear steps. If only four gear steps are provided, only three braking fields are obtained. FIG. 5 illustrates the braking capacity provided with a four-speed complementary mechanical gear affording three braking areas. In FIG. 5, the curve 150 illustrates the braking capacity with a released guide vane member and the turbine member connected to a third gear, of the mechanical gear, with a maximum vehicle speed of 66.5 km/hour. This braking corresponds to the engine speed in accordance with curve 152 which is the speed the engine obtains by the transferred torque through the torque converter. To obtain braking according to curve 154 it is necessary to reduce the engine speed. The line 154 also illustrates the braking obtained with the guide vane member stationary wherein the speed of the engine produced by the transferred torque is represented by curve 156. Curve 158 illustrates the braking capacity when the engine speed is reduced to the speed shown by curve 160. A vehicle speed of 66.5 km/hour in the third gear corresponds to a turbine member speed of 3500 rpm. At speeds between 48 and 52 km/hour it is appropriate to change the mechanical gear to second gear whereby the same circumstances obtain as described with respect to third gear, and when shifting the turbine member to be connected to first gear between 34 to 38 km/hour the field of braking marked III In FIG. 4 is obtained as shown.

As described above in connection with FIG. 5, the hydraulic braking capacity is to be modulated by varying engine speed. Further, under certain circumstances the braking is decreased by driving the engine utilizing the fuel control unit formed by the fuel injection cylinder CFI and fuel cut-off cylinder CFC shown in FIG. 2. In addition to the increased braking effect, under certain circumstances a certain reduction of the engine speed must be effected, the engine speed being dependent on the torque transferred from the rotating turbine member to the pump member of the torque converter. An arrangement for providing this reduction in engine speed is shown in FIG. 2 in the form of engine brake cylinder CEB. The function of the brake cylinder CEB is to control throttling of the exhaust pipe of the engine. The braking effort on the engine is small in relation to the braking effort of the turbine member. Actually, the turbine member, when overspeeded, operates as a pump delivering energy to the pump member of the hydraulic torque converter which is then operating as a turbine.

Naturally the efficiency when thus inverting the function of the torque converter is very low and therefore the driving torque on the engine is relatively small. However, as stated, this is sufficiently high to drive up the engine to a high speed relative to the turbine speed at least when the turbine speed is higher than normal maximum speed.

It will be understood that cooling does not present any problems and, in fact, this cooling will be taken care of even when the engine is kept at low speed. However, cooling of the torque converter can present problems. Because of this the torque converter is supplied with an extra pump 71 located, for instance, on one of the power take-offs. This pump will be disconnected during normal driving. This pump will then receive fluid from the secondary side of the heat exchanger HE and deliver fluid back to the primary side of the heat exchanger HE and/or be used to increase the circulation of fluid through the torque converter to obtain cooling of the torque converter and to increase the cooling of the oil. Under these circumstances it may be desirable to use a part of the oil to drive the engine fan at a higher speed.

Another solution of the problem discussed above is to only utilize the pump unit driven by the power take-off for braking the engine, increasing the fluid through torque converter and driving the fan of the engine. For this purpose it is appropriate to utilize an adjustable vane pump. However, even if this pump can be set at zero capacity, it must be possible to disconnect it with a released clutch during normal operation.

Although the invention has been described with respect to an exemplary embodiment thereof, it will be understood that variations and modifications can be effected in this embodiment without departing from the scope or spirit of the invention.

I claim:

1. A method for braking a vehicle with an engine operatively connected to a transmission which comprises a torque converter having a pump member, a guide member and a turbine member, and a multi-step mechanical gear transmission in series with the torque converter, the multi-step transmission being downstream from the torque converter with the turbine member being connected to the input of the said multi-step transmission, and the output of the multi-step transmission being operatively connected to the road wheels of the vehicle, said method comprising driving the turbine member at a higher speed than the pump member with the sole driving connection from the vehicle road wheels to the pump member being via the turbine member through the torque converter, and with the pump member connected to rotate at the same speed as the engine, and regulating the braking effort by controlling the speed of the engine.

2. A method according to claim 1 including maintaining the guide member of the torque converter stationary to obtain a higher braking torque.

3. A method according to claim 1 including releasing member to rotate freely in either direction.

4. A method according to any one of claims 1-3 wherein the engine is caused to absorb driving torque applied to the pump member by the turbine member by throttling the exhaust pipe of the engine to obtain the desired braking force.

5. A method according to any of claims 1, 2 or 3, including setting the engine at a higher speed than that obtained when driven by the pump member of the torque converter so as to reduce the braking torque.

6. A method according to any of claims 1-3 including having the primary side of the torque converter drive a pump unit for exerting braking torque on the primary side of the converter and wherein the torque is regulated by varying throttling of the pump unit.

7. A method according to claim 6 wherein the pump unit is of the variable capacity type and including regulating the torque by adjusting capacity of the pump unit.

8. A method according to claim 6 wherein the pump unit is of the variable capacity type and including regulating the torque by varying either one or both of the throttling of the pump unit or the capacity of the pump unit.

9. A method according to claim 6 wherein the said pump member is releasable by a friction coupling.

10. A method according to claim 6 further comprising utilizing the working fluid of the torque converter in the pump unit driven from the primary side of the torque converter and channeling the fluid passing the pump unit to circulate through a heat exchanger of the torque conventer.

11. A method according to claim 6 further comprising utilizing a part of the pressure fluid of the pump to drive a cooling fan of the engine by a hydrostatic motor.

12. A method according to any of claims 1-3 wherein the braking capacity level in relation to speed of the vehicle is related to a manual setting and the operation of an electronic control system for the transmission.

13. A method according to claim 12 further comprising controlling both the connection of the gear ratio in the complementary multi-step mechanical gear and the braking or the driving of the engine to obtain the desired level of braking at different vehicle speeds.

14. A method according to claim 12 wherein the torque converter has a releasable pump member or turbine member in which the pump or turbine member is released from driving connection with the engine during the change of step of the multi-step mechanical gears to obtain a hydraulic synchronizing effect to determine the new engine speed.

15. A method according to claim 12 further comprising adjusting engine speed, in relation to the mechanical gear shift made, by controlling the fuel injection to the engine.

16. A method according to claim 1 further comprising connecting reverse gear at low speed and regulating the engine speed to obtain braking to a complete stop.

17. A method according to any one of claims 1-3, said step of controlling the speed of the engine comprising increasing the engine speed by increasing fuel injection to reduce the braking effect.

18. A method according to any one of claims 1-3, said mechanical gear being an eight step gear, and including sensing the vehicle speed and selecting a suitable one of said steps to overspeed the turbine member and to set the engine speed to obtain the desired braking.

* * * * *